Dec. 1, 1959    B. C. ARNOLD    2,914,966
POWER TRANSMISSION MEANS FOR TRACTOR
Filed Oct. 23, 1956    3 Sheets-Sheet 1
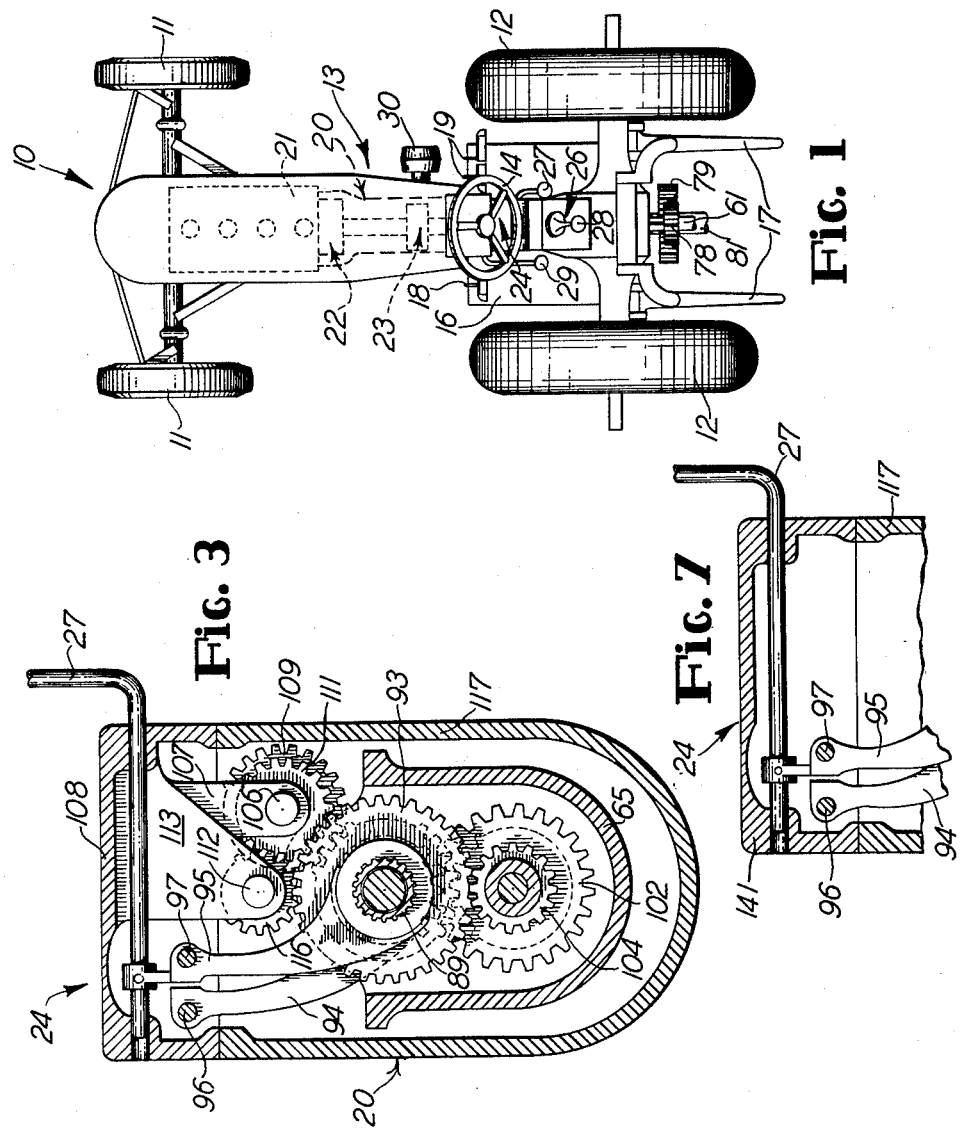
INVENTOR:
BRUCE C. ARNOLD
BY: Emerson B Donnell
ATTORNEY

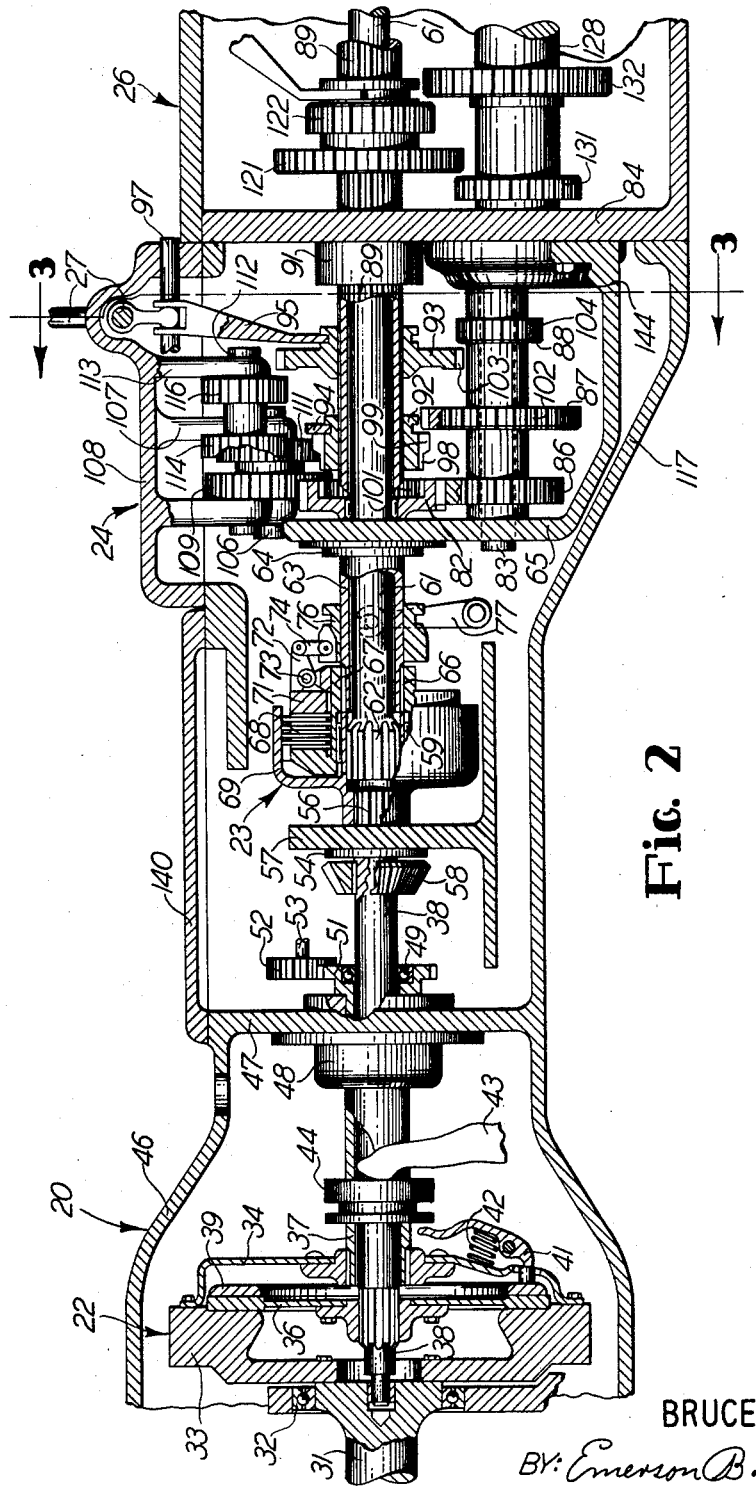

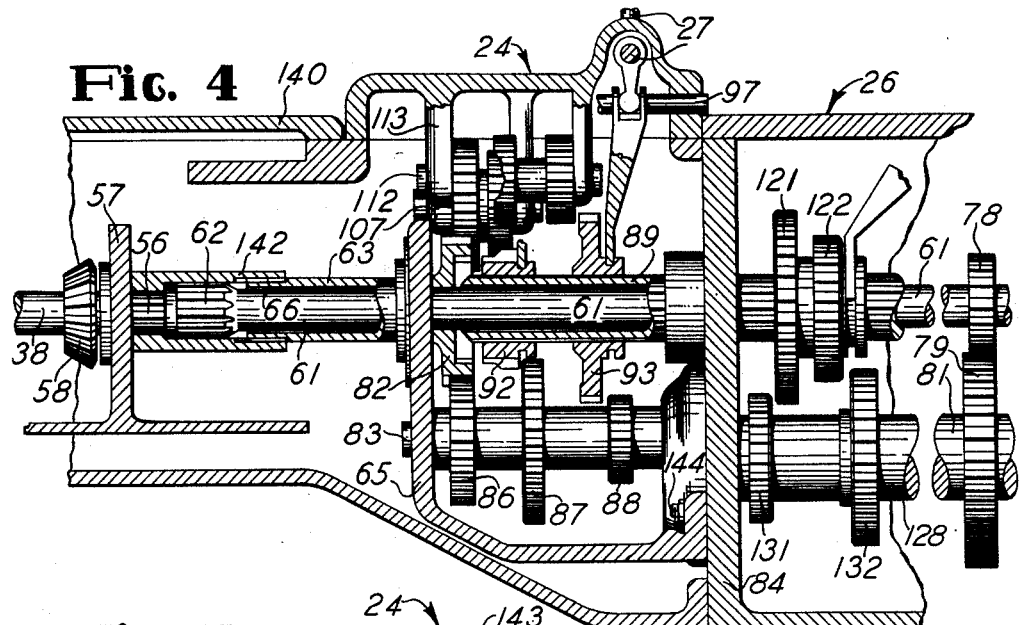
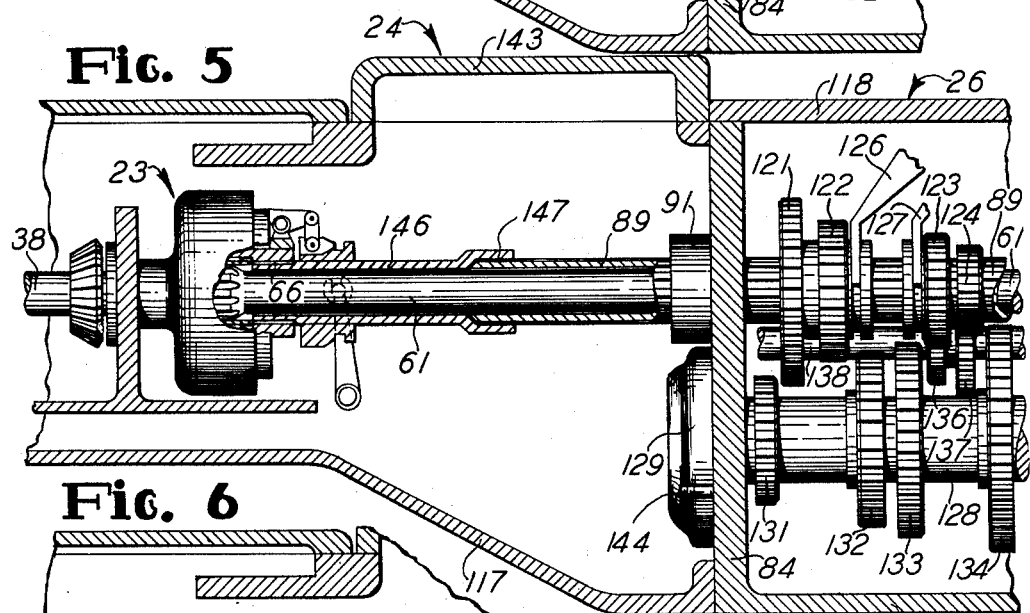
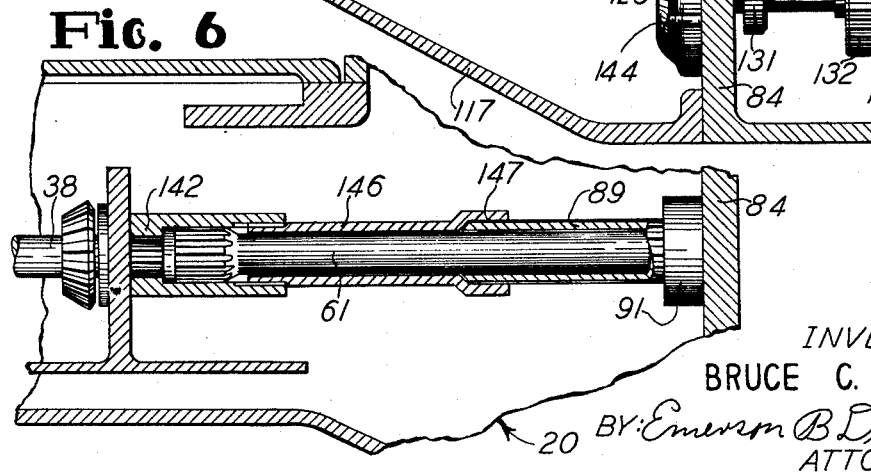

United States Patent Office 2,914,966
Patented Dec. 1, 1959

2,914,966

POWER TRANSMISSION MEANS FOR TRACTOR

Bruce C. Arnold, Rock Island, Ill., assignor to J. I. Case Company, Racine, Wis., a corporation of Wisconsin Application October 23, 1956, Serial No. 617,852

7 Claims. (Cl. 74—745)

The present invention relates to tractors and more particularly to the power transmission expedients thereof, and an object thereof is to generally improve the construction and operation of devices of this class. A further object is to provide a tractor having a greater variety of speeds than has been common in the past. A further object is to furnish a tractor construction which will provide for the assembly of different types of tractors having a plurality of different characteristics from a set of specially constructed parts, which are common to one or more of said different types of tractors, and some of which are common to all said different types of tractors.

More specifically, an object is to supply a tractor which is so constituted that it may be furnished by the selection and assembly of certain stock parts:

(1) As a standard tractor with a so-called conventional transmission giving, for example, four forward speeds or ratios and reverse between the engine and the traction means, (2) Such a tractor with a power take-off, (3) Such a tractor with a power take-off which is independent of the forward motion of the tractor, (4) Such a tractor with an auxiliary speed or ratio change facility giving a choice of a plurality of speeds for each speed selected in the conventional transmission, with a corresponding large total number of speeds available in the tractor, (5) A tractor of the latter type furnished with a power take-off, (6) Such a tractor with a power take-off which is independent of the forward motion of the tractor.

(7) A tractor with the conventional transmission as aforesaid and the auxiliary speed ratio changing mechanism which, by the addition of a relatively minor assembly, can be made to operate in a direction opposite to its normal direction and with the benefit of the plurality of speeds available in the conventional transmission.

Further objects and advantages will become apparent from the following specification and annexed drawings in which:

Fig. 1 is a diagrammatic top plan view of a tractor and its parts which constitute this invention.

Fig. 2 is a left side elevation of the transmission portion of a tractor with the near side wall removed and with parts broken away in axial vertical section where desirable to show internal constructions.

Fig. 3 is a sectional view of the mechanism shown in Fig. 2 on the line 3—3 of Fig. 2.

Figs. 4, 5 and 6 are views of a fragment of Fig. 2 but each having different parts removed and some parts added to each show a different type of tractor construction which it is possible to make within the basic structure of Fig. 2.

Fig. 7 is a fragment of Fig. 3 but showing a modification thereof.

Referring to the drawings, it is pointed out that, in view of the complication and multiplicity of parts in actual tractor construction, the drawings have been simplified and parts have been shown in some instances as shifted slightly from their actual positions for reasons of clarity and for better illustration of parts which would otherwise be obscured in the actual construction. Furthermore, small details which are well-known, conventional, or which form no part of the invention, such, for example, as nuts and bolts, cotter pins, small springs, and the like have been omitted from the drawings since it is understood that the parts shown are held together in a suitable and well-known manner, and such details would serve only to detract from a clear showing of the actual invention.

Fig. 1 is a diagrammatic plan view of a tractor 10 having the usual two front wheels 11 and two rear wheels 12, which are the traction means, supporting the tractor on the ground. The tractor chassis 13 suitably provides the usual frame for connecting the tractor together, the steering wheel 14, and operator's floor or platform 16. The usual powered lift arms 17 are also shown along with a clutch pedal 18 and two brake pedals 19. The tractor frame portion comprises a torque tube or tubular element 20 attached at its front end to an engine 21, and it houses a main clutch 22, a second clutch 23, and a gear set in housing 24. The rear end of the tube 20 is attached to a transmission housing 26, and all are shown dotted and connected in aligned positions behind the engine 21. These latter-mentioned parts are described in detail hereinafter. The tractor also includes conventional shift levers 27 and 28 for operation of the gear set 24 and the transmission 26, respectively, and the lever 29 is for operation of the second clutch 23. The usual belt pulley 30 is also mounted on the tractor.

Fig. 2 shows essentially a longitudinal sectional view of the units mentioned above. A fragment of a crank shaft 31 is shown and it projects from the rear of the engine 21 and is rotatable in a suitably supported bearing 32 with the usual fly wheel 33 bolted to the shaft 31. The usual clutch housing 34 and friction plate 36 are co-axial with and adjacent to the fly wheel 33 and are respectively splined on a sleeve 37 and a shaft 38. Also in the usual arrangement, the housing 34 is bolted to the fly wheel 33, and the pressure plate 39 is rotatable with the housing 34 and is urged against the friction plate and the fly wheel by the lever 41 and the spring 42 to maintain the clutch engaged. The usual lever 43 is fragmentarily shown and is operated by the clutch pedal 18, through any well-known connection, and abuts the collar 44 to press against the lever 41 when the pedal 18 is depressed and to thereby relieve the clutch pressure and disengage the same. Thus, a conventional friction-disc type of clutch is shown as the main clutch 22, and the shaft 38 is rotated only upon engagement of the clutch 22. A housing 46, the front end of the tube 20, suitably encloses the clutch 22, and is shown to include a rear vertical wall 47 which supports a bearing housing 48 for rotatably supporting the sleeve 37. Another bearing 49 is suitably mounted to rotatably support the shaft 38 which extends through the wall 47.

The rearward end of the sleeve 37 has attached thereto a driving gear 51 which rotates with the sleeve 37 and engages a power lift gear 52 supported on a shaft 53. The latter connects to the conventional hydraulic motor (not shown) or the like which powers the lift arms 17 to raise and lower the latter in the well-known manner and for the usual purposes.

The shaft 38 extends through a rotatable bearing support 54 and terminates in a splined end 56. The support 54 can be secured to an extension 57 of the housing 46. A belt pulley driving gear 58 is keyed to the shaft 38 and is available for driving the belt pulley 30 through the usual power train.

The second clutch 23 has a driving half which includes a hub 59 which is splined to the shaft 38, and the clutch is shown to be of the multiple disc type. A shaft 61 is co-axial with the shaft 38 and presents a splined end 62 to which the clutch hub 59 is also splined so that the shafts 38 and 61 are like one continuous shaft. A sleeve 63 is telescoped over the shaft 61 and is rotatably supported thereon and in a bearing housing 64 supported in the housing wall 65. The driven half of the clutch 23 is splined at 66 on the sleeve 63 to rotate therewith while a roller bearing is shown between the hub 59 and a cylinder 67 of the driven half of the clutch.

The conventional parts are employed to transmit rotation between the driving and the driven halves of the clutch. Therefore, the multiple discs 68 are suitably provided with some attached to the flange 69 of the driving half and others attached to the cylinder 67 of the driven half. The discs 68 are pressed together by the ring 71 which is axially moved by the lever 72 fulcrumed on the cylinder 67 at the pin 73. The lever 72 is attached to a link 74 which is in turn attached to a collar 76 slidable on the sleeve 63. The collar 76 is slid by a pivotal arm 77 which is controlled by the lever 29 through conventional linkage not shown.

As mentioned, the clutch 23 is available for transmitting rotation from the shaft 38 to the sleeve 63. Thus, the shaft 61 and the sleeve 63 can rotate together, if desired. It will be noted that the shaft 61 extends to the rear of the tractor, see Figs. 1 and 4, and is not interrupted prior to the pinion 78 on the rear end of the shaft. The pinion 78 is slidably keyed on the shaft 61 to selectively engage the gear 79 on a countershaft 81 rotatable at the rear of the tractor. Thus, the shafts 38 and 61 are essentially one power take-off shaft which is controlled by the main clutch 22 and is a constant running power take-off shaft independent of the rotation of the sleeve 63 which controls the transmission.

The rear end of the sleeve 63 has a driving gear 82 thereon with a roller bearing interposed between the sleeve end and the shaft 61 just to the right of the wall 65. A countershaft 83 is mounted between the wall 65 and wall 84 defining the front of the transmission 26. Three different size gears 86, 87, and 88, medium, large, and small, respectively, are mounted on the countershaft 83 and the three gears rotate together, with the gear 82 always in mesh with the gear 86 and thus the gears 86, 87, and 88 always rotate when the clutches 22 and 23 are engaged and the engine 21 is running.

An externally splined sleeve 89 is telescoped over the shaft 61 which is now seen to extend to the rear end of the tractor. A bearing housing 91 is supported in the wall 84 for rotatable support of the sleeve 89, which is shown into Fig. 5 to extend in the transmission housing 26. A small gear 92 and a larger gear 93 are splined on the sleeve 89 for axial movement thereon and rotation with the sleeve. Conventional shift arms 94 and 95 respectively engage the slip gears 92 and 93 for inducing sliding movement of the gears on the splined sleeve. The arms are attached to the usual rods 96 and 97, see Fig. 3, which are connected to the shift lever 27, and, except as mentioned later, this arrangement is well known and need not be further described or shown.

The gear 92 has two sets of teeth 98 and 99 for respective meshing engagement with the teeth 101 within the gear 82 and teeth 102 on the gear 87. The gear 93 has a set of clutch teeth 103 for meshing with the teeth 104 of the gear 88. Thus, upon engagement of the clutch 23, the sleeve 63 and its gear 82 are rotated to similarly rotate the three countershaft gears 86, 87, and 88. Then, if the gear 92 is moved forward until the teeth 98 mesh with the teeth 101 in the gear 82, the sleeve 89 will rotate at the same speed as the gear 82, which is also the speed of the shaft 61. However, if the gear 92 is moved rearwardly until the teeth 99 mesh with the teeth 102 of the gear 87, the sleeve 89 will be driven by the gear 87 which is a large gear and which will, therefore, cause the sleeve 89 to rotate faster than the gear 82. Also, if the gear 93 is shifted rearwardly until its teeth 103 engage the teeth 104 of the gear 88, the latter will drive the sleeve 89 at a speed slower than the gear 82. Of course, only one of the three previously described gear engagements can be made at one time since the conventional gear shift mechanism is constructed to provide for mutually exclusive selection for each engagement. The engagement between the gears 82 and 92 is a direct drive arrangement, the engagement between the gears 92 and 87 is an overdrive arrangement, and the engagement between the gears 93 and 88 is an underdrive arrangement.

Another countershaft 106 is suitably mounted on brackets 107, also see Fig. 3, attached to and depending from a cover plate 108 enclosing the top of the housing 24 and the rear end of the tube 20. Two gears 109 and 111 are mounted on the shaft 106 for rotation together, and the gear 109 is in constant mesh with the gear 82. Still another countershaft 112 is suitably mounted on brackets 113 attached to and depending from the cover plate 108. Two gears 114 and 116 are reverse idler gear means and are mounted on the shaft 112 for rotation together, and the gear 114 is in constant mesh with the gear 111. The gear 93 can be moved forward into mesh with the gear 116 and then the drive goes from the gear 82 to the gears 109, 111, 114, 116, and 93 to cause the sleeve 89 to rotate in reverse. It will thus be seen that the cover plate 108 carries the reverse gears just described, and removal of the plate 108 would eliminate the reverse feature and accordingly simplify the gearing. The gearing in housing 24, as described, is an auxiliary speed change gearing and its housing, consisting of the plate 108 and flared portion 117 of the tube 20, is an auxiliary speed change housing. Also, the transmission housing 26 is a main speed change gear housing.

The main speed gears are shown complete in Fig. 5 where it will be seen that the housing 26 includes the wall 84, a cover plate 118 and a body 119. The sleeve 89 has two sets of two gears each, namely gears 121 and 122 and gears 123 and 124, splined on the sleeve, and each of the gears has the usual clutch teeth. The usual shift arms 126 and 127 respectively engage the gear sets for forward and rearward shifting of the sets by actuation of the shift lever 28. An output shaft 128 is rotatably mounted in a bearing housing 129 in the wall 84 and gears 131, 132, 133, and 134 are mounted on the shaft 128 for rotation therewith. It will thus be seen that forward movement of the slip gear 121, until it meshes with the gear 131, will transmit rotation from the sleeve 89 to the shaft 128 and the latter will rotate at its high speed because of the relative sizes of the gears 121 and 131. Rearward movement of the slip gear 122 into mesh with the gear 132 will cause the output shaft to rotate at a slower speed. And engagement of gears 123 and 133, or gears 124 and 134 will cause still slower speeds of output shaft rotation. With this gearing, and the fact that the output shaft 128 is in driving relation with the tractor rear wheels 12 through the conventional differential and rear axle (both not shown), the tractor has its usual four forward speeds. One reverse speed is provided by a reverse idler gearing consisting of two gears 136 and 137 rotatable together on their shaft 138 which is suitably mounted in the housing 26. The gears 136 and 137 can be axially moved on the shaft 138 by actuation of the shift lever 28 so that gear 136 engages output gear 133, and gear 137 simultaneously engages driving gear 123. In this arrangement, rotation from the sleeve 89 is reversed to the gears 136 and 137 and again reversed when transmitted through the latter gears to the gear 133, all in a well-known manner.

With the foregoing arrangement, the standard tractor transmission in the housing 26 provides four forward and one reverse speed. Then, with the auxiliary gearing in the housing 24, the speed can be tripled to provide twelve forward speeds and three reverse speeds. A primary advantage of this gearing resides in the fact that by separate use of each of the four forward speeds of the main gearing and engagement of the reverse gears in the auxiliary gearing, four reverse speeds can be produced. This is important in realization of the fact that the main speed reverse gear is not normally constructed for long periods of use, as it is normal to use reverse gears for short periods only. Therefore, when it is desired to operate the tractor in reverse for an entire day of combine operations, corn or cotton picking, and like operations, it is desirable to have the proper reverse gears. On this point, it should be understood that the present trend is to mount implements on the rear of the tractor with the front of the implement faced rearwardly of the tractor and the tractor is then run backward. This gives better balance to the assembly and better traction to the rear wheels since the weight of the implement is mainly on the tractor rear wheels. The auxiliary gears described thus provide the desired reverse gearing through gears designed to run for long uninterrupted periods.

Fig. 7 shows a modification of the housing 24 and its gearing. The cover plate 108 is removable from the portion 117, and since the plate 108 carries the reverse gears 109, 111, 114, and 116, removal of the plate removes the gears. A plate 141, without the reverse gears, can be positioned on the portion 117 to cover the same and provide the same shift arms 94 and 95 and shift lever 27. In this manner, the reverse gears can be eliminated, if they are not desired, by a simple substitution of the plate 141 for the plate 108. This shows the advantage in this construction of being able to simply remove the cover plate 108 for a modified structure with cover plate 141, or for servicing of the gears therebelow.

Figs. 4, 5, and 6 show variations of the entire structure shown in Fig. 2, and it will be seen that desirable sub-combinations can be easily and readily provided from the main combination. Thus, Fig. 4 shows all the basic structure, but the tractor drive clutch 23 is eliminated and a sleeve 142 is substituted for the clutch 23. The splined ends 56 and 62 of shafts 38 and 61 respectively are the same and, correspondingly, the interior of the sleeve 142 is splined to drivingly engage both of the shaft ends and provide a direct and continuous drive between the shafts 38 and 61 just as done by the hub 59 of the driving half of the clutch 23. Also, the sleeve 142 is splined to the sleeve 63 at 66 to provide direct and continuous drive between the shaft 61 and the sleeve 63. Thus, only the main clutch 22 can interrupt rotation of the sleeve 63 and the tractor driving gears, and the result is that there is no constant running power take-off, but the tractor is less expensive. It should also be noted that a cover plate 140 is removably attached to the tube 20 above the clutch 23, and this permits access to the interior of the torque tube below the plate 140.

Fig. 5 shows another variation or sub-combination where the clutch 23 is included but the triple range or auxiliary gear unit 24 is omitted. In this arrangement, cover plate 108 and its attached reversing gears and shift lever are removed and another cover plate 143 is fastened to the tubular flared portion 117. Also, it will be noted in Fig. 4 that the support or wall 65 is secured to the wall 84 of the main transmission 26 by studs, such as the stud 144. The support 65 can be and is removed in Fig. 5 along with the countershaft 83 and its gears. The gears 82, 92, and 93 are removed from the sleeve 89, and the sleeve 63 is also removed. A sleeve 146 is substituted for the sleeve 63 and its one end has the same relation to the clutch 23, while its other end 147 is splined to the sleeve 89 for direct and continuous rotation between the sleeves 146 and 89. Thus, here also a simple and easily accomplished variation of the basic combination of Fig. 2 will provide a tractor, as desired, with a constant running power take-off but without the triple range gearing.

Fig. 6 shows a sub-combination wherein both the clutch 23 and the auxiliary gears of the triple range unit are omitted. The precise structure is apparent from Figs. 4 and 5 taken with Fig. 6. This provides a structure without the constant running power take-off and the triple range unit.

While a specific embodiment of this invention has been shown and described, it should be apparent that certain changes could be made therein, and the scope of this invention should, therefore, be limited only by the appended claims.

What I claim is:

1. In a tractor of the type having an engine and traction means, the combination of a frame portion comprising a tubular element connected at one end to said engine and having at its other end a rearwardly flared portion, a relatively larger main speed change gear housing having a front wall fixed to said rearwardly flared portion, a power transmitting shaft means driven by said engine and extending through said tubular element and said front wall into said speed change gear housing, a separate auxiliary speed change gear housing fixed in relation to said front wall and projecting into said flared portion of said tubular element, a removable cover plate on said flared portion above said auxiliary speed change gear housing, speed change gears in said auxiliary speed change gear housing interposed in said shaft means and constituted to effect an increase of speed in said shaft means where it enters said main speed change gear housing, and said speed change gears being shiftable into another position operative to effect a reduction of speed in said shaft means where it enters said main speed change gear housing, and into another position operative to effect a drive into said main speed change gear housing at the same speed as said engine, reverse idler gear means carried on said cover plate in position to engage with gears in said auxiliary speed change gear housing, and said speed change gears being shiftable into another position in engagement with said reverse idler gear means operative to effect a reverse drive in said shaft means where it enters said main speed change gear housing.

2. In a tractor of the type having an engine and traction means, the combination of a frame portion comprising a tubular element connected at one end to said engine and having at its other end a rearwardly flared portion, a relatively larger main speed change gear housing having a front wall fixed to said rearwardly flared portion, a power transmitting shaft means driven by said engine and extending through said tubular element and said front wall into said speed change gear housing, and a separate auxiliary speed change gear housing fixed in relation to said front wall and projecting into said flared portion of said tubular element, and speed change gears in said auxiliary speed change gear housing interposed in said shaft means and constituted to effect an increase of speed in said shaft means where it enters said main speed change gear housing, and said speed change gears being shiftable into another position operative to effect a reduction of speed in said shaft means where it enters said main speed change gear housing, and into another position operative to effect a drive into said main speed change gear housing at the same speed as said engine.

3. In a tractor of the type having an engine and traction means, the combination of a frame portion comprising a tubular element connected at one end to said engine, a main speed change gear housing having a front wall fixed to the other end of said tubular element, a power transmitting shaft means driven by said engine and extending through said tubular element and said front wall into said speed change gear housing, speed change gears in said tubular element interposed in said shaft means and constituted to effect an increase of speed in said shaft means where it enters said main speed change gear housing, said speed change gears being shiftable into another position operative to effect a reduction of speed in said shaft means where it enters said main speed change gear housing, into another position operative to effect a drive into said main speed change gear housing at the same speed as said engine, and into another position operative to effect a reverse drive in said shaft means where it enters said main speed change gear housing.

4. In a tractor of the type having an engine and traction means, the combination of a frame portion comprising a tubular element connected at one end to said engine, a main speed change gear housing having a front wall fixed to the other end of said tubular element, a power transmitting shaft means driven by said engine and extending through said tubular element and said front wall into said speed change gear housing, speed change gears in said tubular element interposed in said shaft means and constituted to effect an increase of speed in said shaft means where it enters said main speed change gear housing, and said speed change gears being shiftable into another position operative to effect a reduction of speed in said shaft means where it enters said main speed change gear housing, and into another position operative to effect a drive into said main speed change gear housing at the same speed as said engine.

5. In a tractor of the type having an engine and traction means, the combination of a frame portion comprising a tubular element connected at one end to said engine and having at its other end a rearwardly flared portion, a relatively larger main speed change gear housing having a front wall fixed to said rearwardly flared portion, a power transmitting shaft means driven by said engine and extending through said flared portion and said front wall into said speed change gear housing, speed change gears in said flared portion interposed in said shaft means and constituted to effect an increase of speed in said shaft means where it enters said main speed change gear housing, and said speed change gears being shiftable into another position operative to effect a reduction of speed in said shaft means where it enters said main speed change gear housing, and into another position operative to effect a drive into said main speed change gear housing at the same speed as said engine.

6. In a tractor of the type including an engine and traction means driven by the engine, said engine having a fly wheel, a transmission means for supplying the power of the engine to said traction means including the combination of a first clutch driven by the engine and having a clutch housing rotatable with said fly wheel, a friction plate within the housing frictionally engageable with said fly wheel, a shaft driven from said friction plate and extending outside of said housing, a sleeve on said shaft connected with said housing to rotate therewith, a first driving gear on said sleeve, a power lift gear engaged with the first-mentioned gear and driven thereby, a belt pulley driving gear on said shaft, a second clutch driven by said shaft, a second shaft, a portion on said second clutch serving as a coupling for connecting said second shaft in driven relation to said first shaft, a second sleeve on said second shaft, friction means in said second clutch connecting said second sleeve in driven relation to said shafts, a second driving gear on said second sleeve, and transmission gearing engaged with said second driving gear and drivingly connected with said traction means.

7. In a tractor of the type including an engine and traction means driven by the engine, said engine having a fly wheel, a transmission means for supplying the power of the engine to said traction means including the combination of a first clutch driven by the engine and having a clutch housing rotatable with said fly wheel, a friction plate within the housing frictionally engageable with said fly wheel, means for selective engagement of said friction plate with said fly wheel, a shaft driven from said friction plate and extending outside of said housing, a second clutch having a driving half and a driven half and connected to said shaft at the driving half of said second clutch, a second shaft connected to said driving half of said second clutch, a sleeve rotatably telescoped on said second shaft and having connected thereto said driven clutch member, friction means in said second clutch for selectively connecting said driving half and the driven half of said clutch, a driving gear on said sleeve, a countershaft downwardly spaced from said sleeve, a first driven gear on said countershaft continuously engaged with said driving gear, a second sleeve rotatably telescoped on said second shaft, first pairs of engageable gears on said second sleeve and said countershaft and being relatively axially movable for selective engagement to transmit rotation between said gears, said gears on said countershaft all being rotatable with said first driven gear, said gears on said second sleeve all being rotatable with said sleeve, reverse idler gear means adjacent said first pairs of engageable gears and including a first reverse gear in constant driven relation with said driving gear and including a second reverse gear rotatable with said first reverse gear, one of said gears on said second sleeve being slidable into engagement with said second reverse gear, a main output shaft for said traction means, and second pairs of engageable gears on said second sleeve and said output drive shaft for transmitting rotation of said second sleeve to said output drive shaft.

References Cited in the file of this patent

UNITED STATES PATENTS

| | | |
|---|---|---|
| 1,652,475 | Haiss | Dec. 13, 1927 |
| 1,705,032 | Short | Mar. 12, 1929 |
| 2,487,735 | Sherman et al. | Nov. 8, 1949 |
| 2,672,056 | Stone | Mar. 16, 1954 |
| 2,739,487 | Winther | Mar. 27, 1956 |
| 2,756,600 | Kamlukin et al. | July 31, 1956 |

FOREIGN PATENTS

| | | |
|---|---|---|
| 145,552 | Austria | May 11, 1936 |
| 736,521 | Great Britain | Sept. 7, 1955 |